(12) United States Patent
Kim

(10) Patent No.: US 9,160,178 B2
(45) Date of Patent: Oct. 13, 2015

(54) ENERGY STORAGE SYSTEM

(71) Applicant: Samsung SDI Co., Ltd., Yongin-si, Gyeonggi-do (KR)

(72) Inventor: Jaesoon Kim, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 312 days.

(21) Appl. No.: 13/767,321

(22) Filed: Feb. 14, 2013

(65) Prior Publication Data

US 2014/0132217 A1 May 15, 2014

(30) Foreign Application Priority Data

Nov. 12, 2012 (KR) ........................ 10-2012-0127754

(51) Int. Cl.
*H02J 7/00* (2006.01)
(52) U.S. Cl.
CPC ....................................... *H02J 7/00* (2013.01)
(58) Field of Classification Search
CPC .......................... H02J 7/00; H01M 2010/4271
See application file for complete search history.

(56) References Cited

U.S. PATENT DOCUMENTS

| 8,134,338 | B2 | 3/2012 | Choi |
| 2008/0129247 | A1 | 6/2008 | Lee et al. |
| 2011/0037433 | A1 | 2/2011 | Kim |
| 2011/0133555 | A1 | 6/2011 | Choi |
| 2012/0025770 | A1* | 2/2012 | Suzuki et al. ................ 320/118 |
| 2012/0086399 | A1 | 4/2012 | Choi |
| 2012/0105004 | A1* | 5/2012 | Martinelli .................... 320/116 |

FOREIGN PATENT DOCUMENTS

| KR | 10-2006-0073525 | 6/2006 |
| KR | 10-2008-0083771 | 9/2008 |
| KR | 10-2011-0016166 | 2/2011 |

\* cited by examiner

*Primary Examiner* — Nha Nguyen
(74) *Attorney, Agent, or Firm* — Robert E. Bushnell, Esq.

(57) ABSTRACT

An energy storage system that includes a battery module including a plurality of battery cells, a battery management module connected to the battery cells through a plurality of first wires, detecting voltages of the battery cells and performing first cell balancing operations of the battery cells, and an external balancing module connected to the battery cells through a plurality of second wires, discharging the battery cells to a predetermined voltage and performing second cell balancing operations of the battery cells.

15 Claims, 3 Drawing Sheets

ENERGY STORAGE SYSTEM

CLAIM PRIORITY

This application makes reference to, incorporates the same herein, and claims all benefits accruing under 35 U.S.C. §119 from an application earlier filed in the Korean Intellectual Property Office on 12 Nov. 2012 and there duly assigned Serial No 10-2012-0127754.

BACKGROUND OF THE INVENTION

1. Field of the Invention

Aspects of the present invention generally relate to an energy storage system.

2. Description of the Related Art

An energy storage system that is a hybrid combination of a solar power generation system and a power storage system can store surplus power from a solar cell and a grid that is supplied to a load while supplying power to the load in a secured manner in the event of power failure.

The above information disclosed in this Related Art section is only for enhancement of understanding of the background of the invention and therefore it may contain information that does not form the prior art that is already known to a person of ordinary skill in the art.

SUMMARY OF THE INVENTION

It is therefore an aspect of the present invention to provide an energy storage system, which can perform a more efficient cell balancing operation.

At least one of the above and other features and advantages may be realized by providing an energy storage system that includes a battery module including a plurality of battery cells, a battery management module connected to the battery cells through a plurality of first wires, detecting voltages of the battery cells and performing first cell balancing operations of the battery cells, and an external balancing module connected to the battery cells through a plurality of second wires, discharging the battery cells to a predetermined voltage and performing second cell balancing operations of the battery cells. The battery module may further include first connectors installed at electrode terminals of the battery cells and connecting the battery cells to an external device.

The battery management module may include the first wires connected to the battery cells, respectively, a plurality of internal balancing device units connected to the battery cells in parallel through the first wires, a controller detecting voltages of the battery cells through the first wires and controlling the internal balancing device units to perform the first cell balancing operations, and first data ports for controlling a control signal based on the information on the voltages of the battery cells from the controller to an external device.

The internal balancing device units may include internal balancing resistors and internal balancing switches connected in series between the first wires.

The battery management module may discharge a second battery cells having higher voltages than a first battery cell having the lowest voltage, among the plurality of battery cells until each voltage of the second battery cells is equal to the voltage of the first battery cell.

The external balancing module may include the second wires connected to the battery cells, respectively, a plurality of external balancing device units connected in series between the second wires, and second data ports receiving the control signal based on the information on the voltages of the battery cells from the battery management module.

The energy storage system may further include second connectors installed in the second wires and connecting the external balancing device units to the battery cells, respectively.

The external balancing device units may include external balancing resistors and external balancing switches connected in series between the second wires.

The external balancing resistors may be cement resistors.

The external balancing module may forcibly discharge voltages of the battery cells to a predetermined voltage level according to the control signal.

The second wires may have larger diameters than the first wires.

The second wires may have higher allowable current than the first wires.

The external balancing module may discharge the battery cells to a higher current than the battery management module.

The external balancing module may be installed to be attached to/detached from the battery module and the battery management module.

At least one of the above and other features and advantages may be realized by providing a cell balancing system of an energy storage system comprising a battery module including a plurality of battery cells and a battery management module connected to the battery cells through a plurality of first wires, detecting voltages of the battery cells and performing first cell balancing operations of the battery cells, the cell balancing system comprising: a plurality of second wires, connectors installed in the second wires and connecting the second wires to the battery cells, respectively, a plurality of balancing device units connected in series between the second wires, and data ports for receiving information on voltages of the battery cells from the battery management module, wherein the cell balancing system is installed to be attached to/detached from the battery module and the battery management module through the connectors and the data ports, discharges the battery cells to a predetermined voltage level and performs second cell balancing operations.

According to the present invention, an energy storage system is provided, which can perform a more efficient cell balancing operation.

Additional aspects and/or advantages of the invention will be set forth in part in the description which follows and, in part, will be obvious from the description, or may be learned by practice of the invention.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
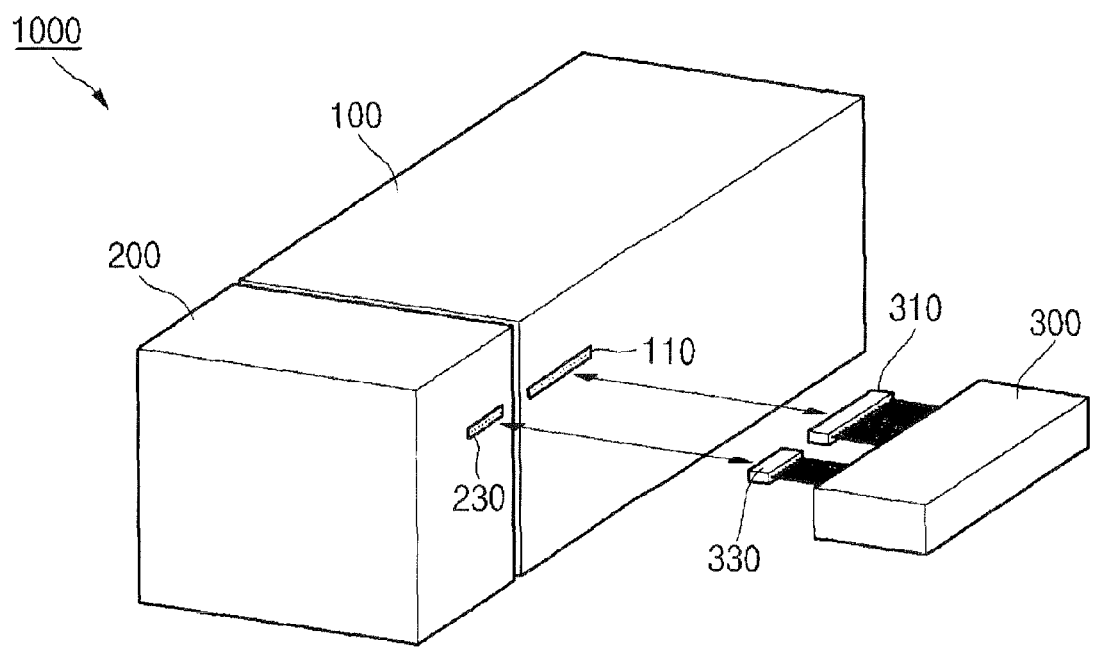
FIG. 1 schematically illustrates a configuration of an energy storage system according to an embodiment of the present invention.

A more complete appreciation of the invention, and many of the attendant advantages thereof, will be readily apparent as the same becomes better understood by reference to the following detailed description when considered in conjunction with the accompanying drawings, in which like reference symbols indicate the same or similar components. The inventive concept may, however, be embodied in many different forms and should not be construed as limited to the example embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like or similar reference numerals refer to like or similar elements throughout. As used herein, the term "and/or" includes any and all combinations of one or more of the associated listed items.

It will be understood that, although the terms first, second, third etc. may be used herein to describe various elements, components, regions, layers, patterns and/or sections, these elements, components, regions, layers, patterns and/or sections should not be limited by these terms. These terms are only used to distinguish one element, component, region, layer pattern or section from another region, layer, pattern or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross sectional illustrations that are schematic illustrations of illustratively idealized example embodiments (and intermediate structures) of the inventive concept. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of the inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In an energy storage system, a power storage system is largely composed of a battery module including a plurality of battery cells, and a battery management module controlling charging/discharging of the battery module and performing cell balancing operations.

In general, a cell balancing operation in a battery pack for use in a notebook computer or an electrically driven device is performed with a low balancing current (or discharge current). Since the battery pack use small-sized circular cells, it has a very low capacity of 1 Ah to 3 Ah, and the cell balancing operation is performed based on a passive cell balancing method in which the current of several tens of milliamperes (mA) is made to flow to a resistor.

However, since the capacity of battery cells used in the energy storage system is in a range of 50 Ah to 60 Ah, it is difficult to efficiently perform a cell balancing operation by adopting a cell balancing current level of a general small-sized battery pack.

Figure 2:
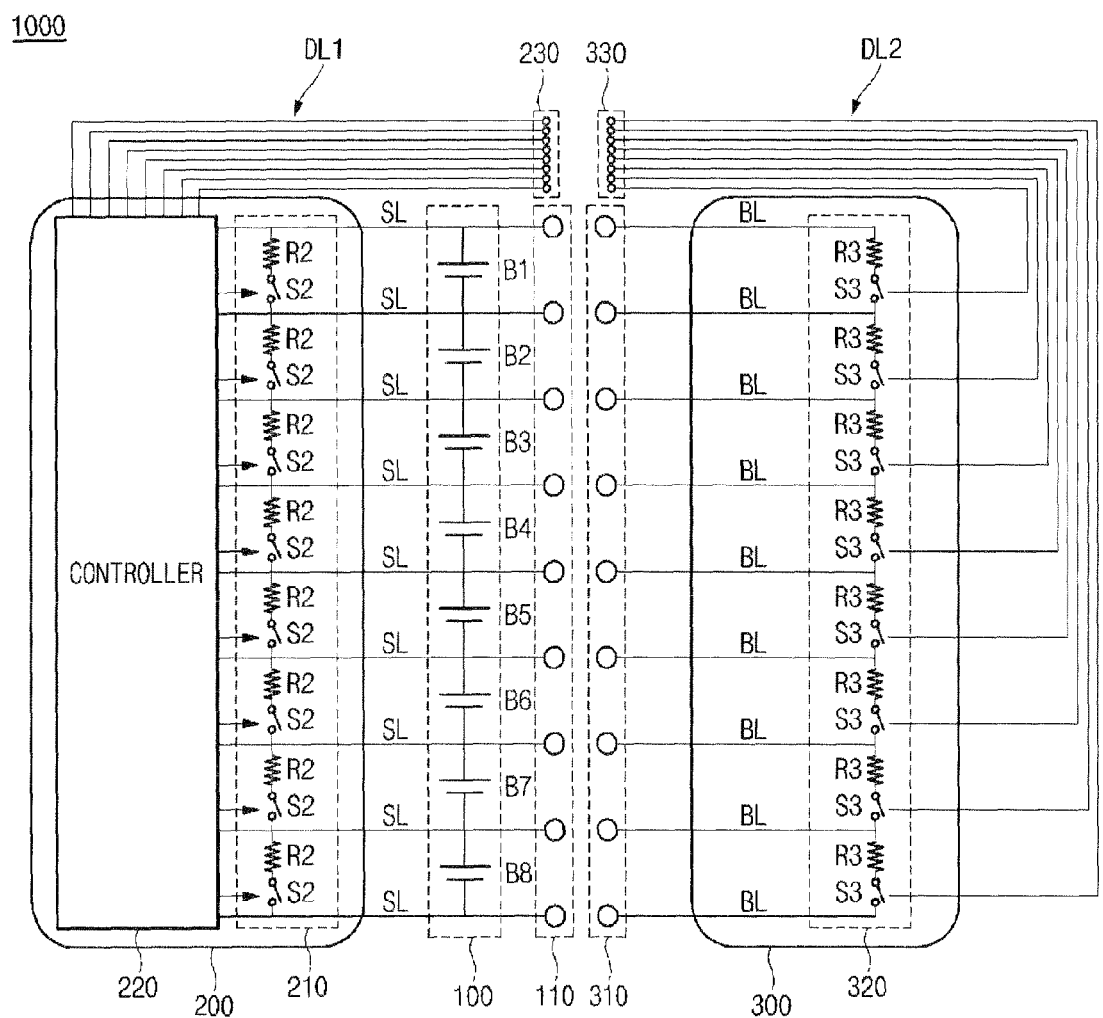
FIG. 2 is a circuit view of an energy storage system according to an embodiment of the present invention.

FIG. 1 schematically illustrates a configuration of an energy storage system 1000 according to an embodiment of the present invention and FIG. 2 is a circuit view of an energy storage system 1000 according to an embodiment of the present invention.

Referring to FIGS. 1 and 2, the energy storage system 1000 according to an embodiment of the present invention includes a battery module 100, a battery management module 200, and an external balancing module 300.

The battery module 100 may supply battery power. The battery module 100 may be a rechargeable battery capable of charging/discharging and may be constituted by a plurality of small-capacity battery cells to implement large-capacity power or a single large-capacity battery cell. For example, as shown in FIG. 2, the battery module 100 may include a plurality of battery cells B1 to B8. The plurality of battery cells B1 to B8 are in series connected to each other to form the battery module 100. In addition, the battery module 100 serves as a basic unit and may be constituted by a plurality of battery modules connected in parallel to each other. Hereinafter, in the illustrated embodiment, for the sake of convenient explanation, the present invention will be described with regard to a single battery module 100 including 8 battery cells B1 to B8 connected in series to each other by way of example.

The battery management module 200 may be connected to two terminals of the battery cells B1 to B8, that is, first terminals (+) and second terminals (−), through a plurality of first wires SL, respectively, and maintains and manages various states of the battery cells B1 to B8 to secure stability of the battery cells B1 to B8. In detail, the battery management module 200 may monitor voltages of the battery cells B1 to B8 through the first wires SL and may perform cell balancing operations of the battery cells B1 to B8. That is to say, the battery management module 200 may detect voltages of the battery cells B1 to B8 and may perform cell balancing operations on cell voltages higher than the lowest cell voltage based on the voltage of the battery cell having the lowest voltage, among the plurality of battery cells B1 to B8.

For example, when the voltage of the second battery cell B2 is detected to be the lowest cell voltage, balancing operations are performed only on the battery cells having approximately 20 mV higher than the second battery cell B2, and the balancing operations are terminated when a voltage difference between cells is less than or equal to 10 mV.

As described above, in order to perform own balancing operations on the plurality of battery cells B1 to B8, the battery management module 200 may include a plurality of first wires L1, a plurality of balancing device units 210 (to be referred to as internal balancing device units, hereinafter) and a controller 220.

The plurality of first wires SL may be connected to two terminals of the battery cells B1 to B8, that is, first terminals (+) and second terminals (−), through a plurality of first wires SL, respectively, and may be used to detect voltages of the battery cells B1 to B8 and to perform cell balancing operations of the battery cells B1 to B8, as described above.

The internal balancing device units 210 may include a plurality of sub internal balancing device units R2 and S2 connected in parallel to the plurality of battery cells B1 to B8 through the first wires SL. Each of the sub internal balancing device units R2 and S2 may include internal balancing resistors R2 and internal balancing switches S2, which are connected in series to each other.

The controller 220 may be connected to the battery cells B1 to B8 through the plurality of first wires SL and detects voltages of the battery cells B1 to B8. In addition, the controller 220 may perform cell balancing operations on cell voltages higher than the lowest cell voltage based on the voltage of the battery cell having the lowest voltage, among the plurality of battery cells B1 to B8.

For example, when the voltage of the second battery cell B2 among the battery cells B1 to B8 is detected to be the lowest cell voltage, the controller 220 may perform balancing operations on the battery cells whose voltages are a predetermined level higher than the voltage of the second battery cell B2, such that a voltage difference between the second battery cell B2 and each of the battery cells B1 and B3 to B8 is greater than or equal to the predetermined level. In a case where a balancing operation needs to be performed on the third battery cell B3, the controller 220 may turn on the third internal balancing switches S2 connected in parallel to the third battery cell B3. Here, the current output from the third battery cell B3 may be consumed through third internal balancing resistors R3. Here, the controller 220 maintains a turned-on state of the third internal balancing switches S2 until a voltage difference between two cells B2 and B3 reaches a predetermined level or less, and when the voltage difference between two cells B2 and B3 reaches a predetermined level or less, the third internal balancing switches S2 are turned off, thereby terminating the cell balancing operations.

Hereinafter, a cell balancing system suitable to operating the energy storage system 1000 will be described in more detail. More specifically, the external balancing module 300 installed to be attached to/detached from the battery module 100 and the battery management module 200 will be described in detail.

Referring to FIG. 2, the external balancing module 300 according to an embodiment of the present invention may include a plurality of second wires BL, external balancing device units 320 and second data ports 330.

The plurality of second wires BL may be configured to correspond to the plurality of first wires SL in number. The second wires BL are used as high current paths for performing cell balancing operations on the plurality of battery cells B1 to B8 within a short time, and electric wires having relatively high allowable current are suitably selected and used as the second wires BL. For example, when AWG22 (maximum allowable current: 3 A) is selected and used as the first wires SL, AWG18 (allowable current: 7~16 A) may be selected and used as the second wires BL. In general, the higher the allowable current is, the larger the diameter of an electric wire becomes.

Second connectors 310 for connecting the external balancing device units 320 and the plurality of battery cells B1 to B8 may be installed in the plurality of second wires BL. Here, first connectors 110 are further installed at the respective electrode terminals of the battery module 100. The first connectors 110 may be connected to the second connectors 310 while cell balancing operations are performed using the external balancing module 300. In a case where the first and second connectors 110 and 310 are connected to each other, the plurality of second wires BL may be electrically connected to the plurality of battery cells B1 to B8, respectively.

The external balancing device units 320 may include a plurality of sub external balancing device units R3 and S3 connected in parallel to the battery cells B1 to B8 through the plurality of second wires SL. The sub external balancing device units R3 and S3 may include external balancing resistors R3 and external balancing switches S3 connected in series, respectively. Since high current may flow in the external balancing resistors R3, cement resistors having excellent heat generating characteristics may be used as the external balancing resistors R3. In addition, devices capable of flowing out high current may be used as the external balancing switches S3.

The second data ports 330 may receive information on the voltages of the battery cells B1 to B8, as detected from the controller 220. Here, the first data ports 230 for transmitting information on voltages of the plurality of battery cells B1 to B8 to the controller 220 are installed. When the first and second data ports 230 and 330 are connected to each other, the external balancing module 300 may receive the information on voltages of the plurality of battery cells B1 to B8. Here, the information on voltages of the plurality of battery cells B1 to B8 may include control signals of the external balancing switches S3 based on the detected voltages of the battery cells B1 to B8, which will later be described in more detail.

Meanwhile, the first data ports 230 and the second data ports 330 may transmit data to corresponding components through a first data wire DL1 and a second data wire DL2.

Hereinafter, the operation of the external balancing module 300 according to an embodiment of the present invention will be described in detail.

Figure 3:
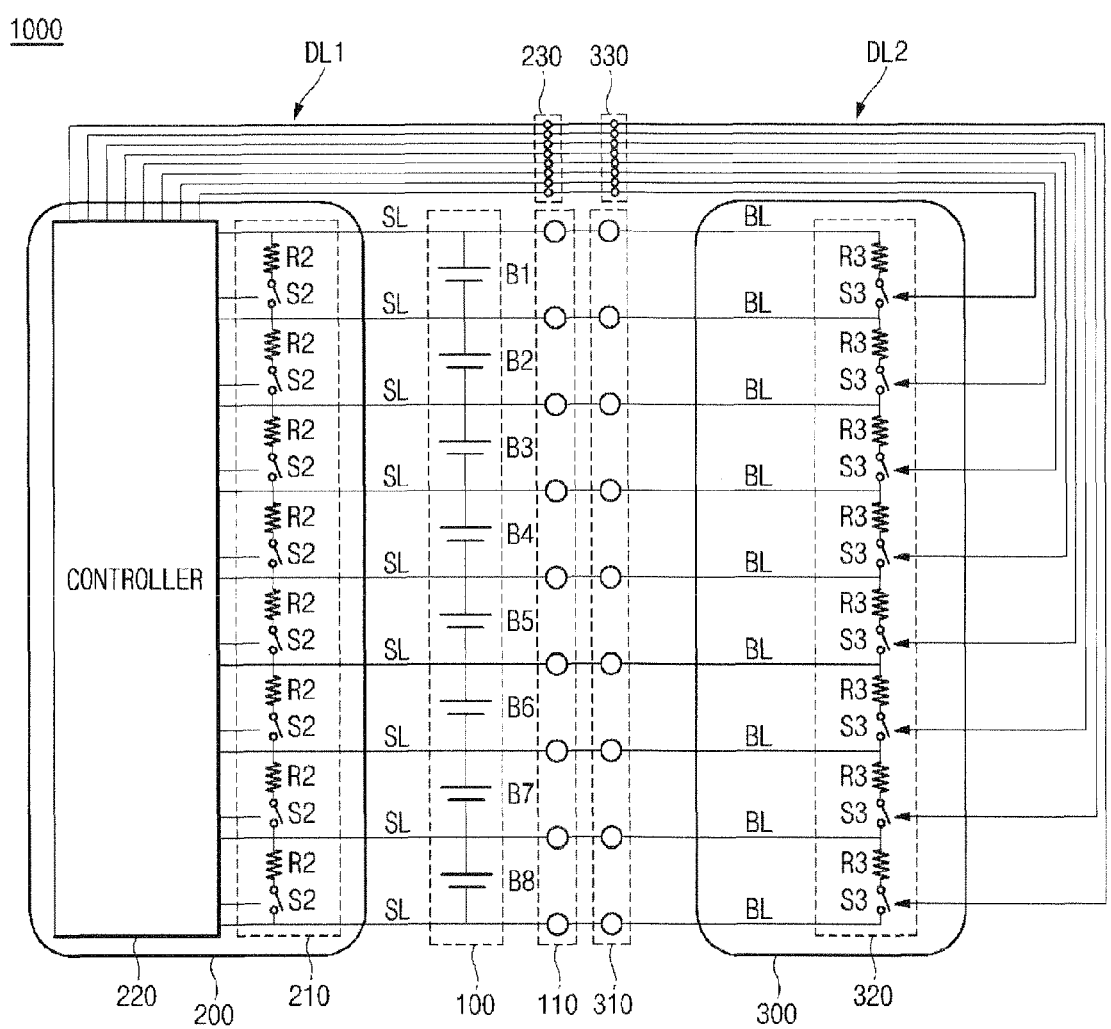
FIG. 3 is a circuit view illustrating a state in which an external balancing module shown in FIG. 2 is assembled with a battery module and a battery management module.

FIG. 3 is a circuit view illustrating a state in which an external balancing module 300 shown in FIG. 2 is assembled with a battery module 100 and a battery management module 200.

The external balancing module 300 to an embodiment of the present invention may be assembled with the battery module 100 and the battery management module 200 during a regular maintenance and repair cycle (6 to 12 months) of the energy storage system 1000 and may perform cell balancing operations. In addition, during normal operation of the energy storage system 1000, the external balancing module 300 may be detached from the battery module 100 and the battery management module 200. In this case, the cell balancing operation may be performed by the battery management module 200 but may be skipped according to necessity. The external balancing module 300 may be detached from/attached to the battery module 100 and the battery management module 200 through the first and second connectors 110 and 310 and the first and second data ports 230 and 330.

As shown in FIG. 3, when the external balancing module 300 is assembled with the battery module 100 and the battery management module 200, the controller 220 may transmit information on voltages of the battery cells B1 to B8 to the external balancing module 300 through the first and second data ports 230 and 330, and the external balancing module 300 may apply the received information to control terminals of the external balancing switches S3. Here, the information on voltages of the battery cells B1 to B8 may include control signals of the external balancing switches S3 based on the voltages of the battery cells B1 to B8.

For example, when the first and second connectors 110 and 310 are connected to each other and the first and second data ports 230 and 330 are connected to each other, the controller 220 may transmit the control signals turning on all of the external balancing switches S3 through the first and second data ports 230 and 330. Accordingly, all of the external balancing switches S3 are turned on, and a discharge current of several to several tens of amperes may flow through the first and second connectors 110 and 310 and the plurality of second wires BL from the plurality of battery cells B1 to B8. In addition, the discharge current may be consumed by the corresponding external balancing resistors R3, thereby performing cell balancing operations of the battery module 100.

The external balancing module 300 performs a forced discharge operation until a target voltage (or a target voltage range) is reached for every cell, rather than a discharge operation on a particular cell like in the cell balancing operation of the battery management module 100. Here, the plurality of battery cells B1 to B8 may be discharged until they reach the target voltage (or the target voltage range). The controller 220 may consistently monitor voltages of the battery cells B1 to B8, and when a target voltage (or target voltage range) is detected from an arbitrary cell, the control signals for turning off the corresponding external balancing switches S3 are output, thereby terminating discharging of the corresponding cell. In such a manner, the cell balancing operations are performed until target voltages (or target voltage ranges) of the battery cells B1 to B8 are all detected.

Thereafter, if the voltages of all the battery cells B1 to B8 are equal to each other, the controller 220 turns off all of the external balancing switches S3 to terminate the cell balancing operations through the external balancing module 300.

Meanwhile, in a state in which cell balancing has not yet been terminated, the first and second connectors 110 and 310 and the first and second data ports 230 and 330 are disconnected from each other, thereby forcibly terminating cell balancing operations.

According to the embodiment of the present invention, since the second wires BL have higher allowable current (or larger diameters) than the first wires SL, higher current may continuously flow in the second wires BL than in the first wires SL. Accordingly, the external balancing module 300 may perform cell balancing operations of the large-capacity battery module 100 within a short time.

An example embodiment of the energy storage system has been disclosed herein, and although specific terms are employed, it is used and is to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An energy storage system, comprising:
a battery module including a plurality of battery cells;
a battery management module connected to the battery cells through a plurality of first wires, detecting voltages of the battery cells and performing first cell balancing operations of the battery cells; and
an external balancing module connected to the battery cells through a plurality of second wires, discharging the battery cells to a predetermined voltage and performing second cell balancing operations of the battery cells,
wherein the external balancing module is installed to be attached and detached from the battery module and the battery management module.

2. The energy storage system of claim 1, wherein the battery module further includes first connectors installed at electrode terminals of the battery cells and connecting the battery cells to an external device.

3. The energy storage system of claim 1, wherein the battery management module comprises:
the first wires connected to the battery cells, respectively;
a plurality of internal balancing device units connected to the battery cells in parallel through the first wires;
a controller detecting voltages of the battery cells through the first wires and controlling the internal balancing device units to perform the first cell balancing operations; and
first data ports for controlling a control signal based on the information on the voltages of the battery cells from the controller to an external device.

4. The energy storage system of claim 3, wherein the internal balancing device units include internal balancing resistors and internal balancing switches connected in series between the first wires.

5. The energy storage system of claim 1, wherein the battery management module discharges a second battery cells having higher voltages than a first battery cell having the lowest voltage, among the plurality of battery cells until each voltage of the second battery cells is equal to the voltage of the first battery cell.

6. The energy storage system of claim 1, wherein the second wires have larger diameters than the first wires.

7. The energy storage system of claim 1, wherein the second wires have higher allowable current than the first wires.

8. The energy storage system of claim 1, wherein the external balancing module discharges the battery cells to a higher current than the battery management module.

9. An energy storage system, comprising:
a battery module including a plurality of battery cells;
a battery management module connected to the battery cells through a plurality of first wires, detecting voltages of the battery cells and performing first cell balancing operations of the battery cells; and
an external balancing module connected to the battery cells through a plurality of second wires, discharging the battery cells to a predetermined voltage and performing second cell balancing operations of the battery cells,
wherein the external balancing module comprises:
said plurality of second wires connected to said plurality of battery cells, respectively;
a plurality of external balancing device units connected in series between the second wires; and
second data ports receiving the control signal based on the information on the voltages of the battery cells from the battery management module.

10. The energy storage system of claim 9, further comprising second connectors installed in the second wires and connecting the external balancing device units to the battery cells, respectively.

11. The energy storage system of claim 9, wherein the external balancing device units include external balancing resistors and external balancing switches connected in series between the second wires.

12. The energy storage system of claim 11, wherein the external balancing resistors are cement resistors.

13. The energy storage system of claim 9, wherein the external balancing module forcibly discharges voltages of the battery cells to a predetermined voltage level according to the control signal.

14. A cell balancing system of an energy storage system comprising a battery module including a plurality of battery cells and a battery management module connected to the battery cells through a plurality of first wires, detecting voltages of the battery cells and performing first cell balancing operations of the battery cells, the cell balancing system, comprising:

a plurality of second wires;

connectors installed in the second wires and connecting the second wires to the battery cells, respectively;

a plurality of balancing device units connected in series between the second wires; and data ports for receiving information on voltages of the battery cells from the battery management module, wherein the cell balancing system is installed to be attached and detached from the battery module and the battery management module through the connectors and the data ports, discharges the battery cells to a predetermined voltage level and performs second cell balancing operations.

15. The cell balancing system recited in claim 14, wherein the battery management module discharges one or more of the plurality of second battery cells having higher voltages than one of the plurality of battery cells having a lowest voltage, among the plurality of battery cells until each voltage level of each of the plurality of second battery cells is equal.

* * * * *